United States Patent

Watson

[11] 3,880,393
[45] Apr. 29, 1975

[54] LOAD BALANCER WITH BALANCE OVERRIDE CONTROL

[75] Inventor: Robert W. Watson, Mendota, Ill.

[73] Assignee: Conco Inc., Mendota, Ill.

[22] Filed: June 4, 1973

[21] Appl. No.: 366,783

[52] U.S. Cl. ............................ 248/325; 254/168
[51] Int. Cl. ......... B66d 1/00; B66d 1/08; B66d 1/48
[58] Field of Search ............ 248/325; 254/168, 189

[56] References Cited
UNITED STATES PATENTS

| | | | |
|---|---|---|---|
| 3,259,352 | 7/1966 | Olsen | 248/325 |
| 3,325,148 | 6/1967 | Powell | 254/168 X |
| 3,402,911 | 9/1968 | O'Neill | 248/325 |
| 3,537,686 | 11/1970 | McKendrick | 254/168 |
| 3,675,899 | 7/1972 | McKendrick | 254/168 |
| 3,721,416 | 3/1973 | Goudreau | 248/325 |
| 3,747,886 | 7/1973 | Carlson | 248/325 |
| 3,756,563 | 9/1973 | Stone | 254/168 |
| 3,758,079 | 9/1973 | Workman | 254/168 |
| 3,773,296 | 11/1973 | McKendrick | 254/168 X |
| 3,791,627 | 2/1974 | Stone | 254/168 |

Primary Examiner—J. Franklin Foss
Attorney, Agent, or Firm—Wegner, Stellman, McCord, Wiles & Wood

[57] ABSTRACT

A load balancer with a balance override control wherein a load may be supported in a balanced condition for manual movement to a variety of positions with the balance override control providing for positive raising or lowering of the load by effecting a by-pass of the normal control circuitry and imposing a control pressure different from that utilized in maintaining the load in balanced condition.

5 Claims, 2 Drawing Figures

1

LOAD BALANCER WITH BALANCE OVERRIDE CONTROL

BACKGROUND OF THE INVENTION

This invention pertains to load balancers for supporting a load in balanced condition in a variety of positions whereby the load may be moved manually with the minimum application of force and, more particularly, to a balance override control for such a load balancer which enables positive raising and lowering of the load without the application of manual force and with return of the system to balanced condition when the balance override control is deactivated.

The assignee of this application has a number of patents on load balancers using fluid control circuitry for obtaining a balanced condition for a load in a variety of positions. Such load balancers are shown in Olsen U.S. Pat. No. 3,259,351 wherein the basic control circuitry for a load balancer is disclosed in a number of different embodiments. A variation in the control circuitry is shown in Olsen U.S. Pat. No. 3,259,352. Control circuits of this type with additional controls for safety in operation in the event there is a loss of fluid pressure or loss of load are shown in Carlson et al. application Ser. No. 181,906, filed Sept. 20, 1971. The safety controls disclosed in the prior application are disclosed in the circuit of this application and the disclosure thereof in said prior application is incorporated herein by reference.

In the aforesaid patents and application of the assignee of this application, there are provisions for establishing a number of different control pressures for balancing different loads or fixtures on a load support arm with the control pressures being set by pressure regulating valves. There is no provision in these controls for a balance override control whereby the load may be positively lifted by the use of fluid pressure or for positive lowering of the load by reducing the control pressure. It is possible to manually dial adjusted control pressure in the pressure regulators of such circuits. However, this loses the established control pressure for obtaining a balanced condition for a particular load.

U.S. Pat. No. 3,721,416, owned by the assignee of this application discloses a load balancer with a power assist mechanism whereby manual force does not directly move the load but is detected and a control system operates a power cylinder to obtain controlled powered lift and also lowering of a load. The disclosure of this patent does not relate to a balancer where a load is maintained in balanced condition with the application of a small amount of manual force causing direct movement of the load. In the patented load balancer, the application of manual force can only cause the power system to positively move the load.

It is also known in the prior art to associate a load balancer with a hoist device whereby the power-operated hoist may adjust the position of a load by power and with there being a limited range of movement of a load with the load in balanced condition due to suspension of the load balancer on the hoist. In this type of device, there is no provision for using the power cylinder of the load balancer as the prime mover for obtaining both balanced operation of the load as well as separately controlled powered lift and lowering of the load.

SUMMARY

A primary feature of the invention disclosed herein is to provide a load balancer providing for balancing of one or more different weight loads in a variety of positions and with a balance override control which does not effect the setting of a fluid pressure for obtaining balanced movement of the load but is effective to temporarily bypass the set control pressure and apply a pressure a fixed increment or amount above the established control pressure to the power cylinder of the balancer to provide positive lifting of the load and with return of the balancer to balanced condition by re-establishing the set control pressure when the balance override control is deactivated.

Another feature of the invention is to provide a load balancer as defined in the preceding paragraph wherein the set control pressure may also be bypassed by the balance override control to cause a reduction in the control pressure applied to the power cylinder of the load balancer whereby the load is permitted to descend by gravity and the load balancer returns to the preset balanced condition when the balance override control is deactivated.

With the foregoing features of the load balancer, it is possible to use the basic structure of the load balancer including its power cylinder for obtaining both balancer and operation and positive movement of a load supported by the load balancer merely by the addition of a balance override control system to the control circuit for the load balancer and without the use of any additional structural power components.

Another advantage of the invention is in the use of a balance override control which functions to temporarily bypass a preset control pressure of a fluid which provides balanced operation whereby either a greater or lesser fluid pressure is caused to exist in the power cylinder of the load balancer to provide either lifting or lowering of a load respectively and, upon deactivation of the balance override control, the load balancer immediately returns to the balanced condition and utilization of the preset control pressure.

DESCRIPTION OF THE PREFERRED EMBODIMENT

Figure 1:
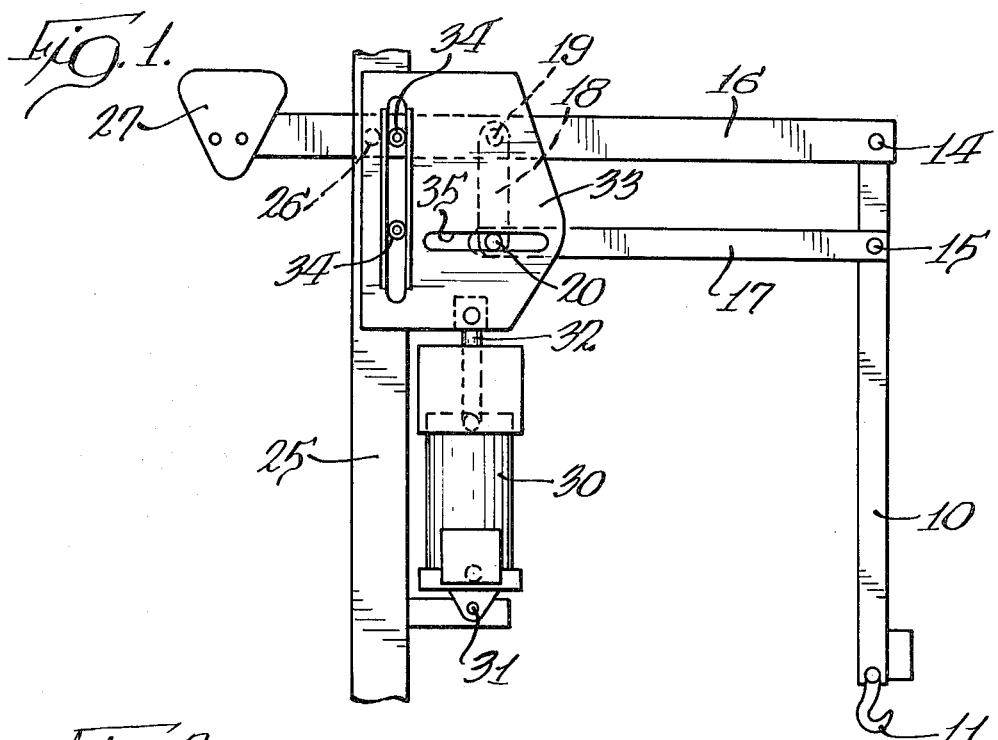
FIG. 1 is a fragmentary side elevational view of a load balancer.

The load balancer illustrated specifically is of the type having a parallelogram arm system wherein a load support arm 10 has means, such as a hook 11, for engaging a load and is pivotally connected at 14 and 15, respectively, to an upper arm 16 and a lower arm 17 of a parallelogram linkage. The fourth arm of this linkage is an arm 18 pivotally connected to the upper arm 16 and lower arm 17 at pivot connections 19 and 20, respectively. The upper arm 16 is pivotally mounted to a support 25 at a pivot 26, with basic parallelogram arm system being balanced by a weight 27 carried at an end of the upper arm 16.

A power cylinder 30 connected to the support 25 through a pivot connection 31 has a piston with a rod 32 extending therefrom which connects to a plate structure 33 having guide surfaces coacting with rollers 34 on the support 25 for guiding the plate structure for vertical movement and horizontal slot structure 35 coacting with rollers associated with the pivot 20 whereby a control pressure may be applied to the underside of the piston within the cylinder 30 which is set at an amount to balance a load on the load support arm 10.

The foregoing structure is of the type shown in O'Neill U.S. Pat. No. 3,402,911 and Goudreau U.S. Pat. No. 3,615,067 and reference may be made thereto for a more detailed understanding of this structure. The foregoing structure is given as an example of a load balancer, with other types of load balancers including a single axis balancer, where the load support arm is in axial alignment with the piston rod of the power cylinder. Additional types include balancers where linear movement of a power cylinder structure is converted to rotary motion to obtain balancing of a load.

Figure 2:
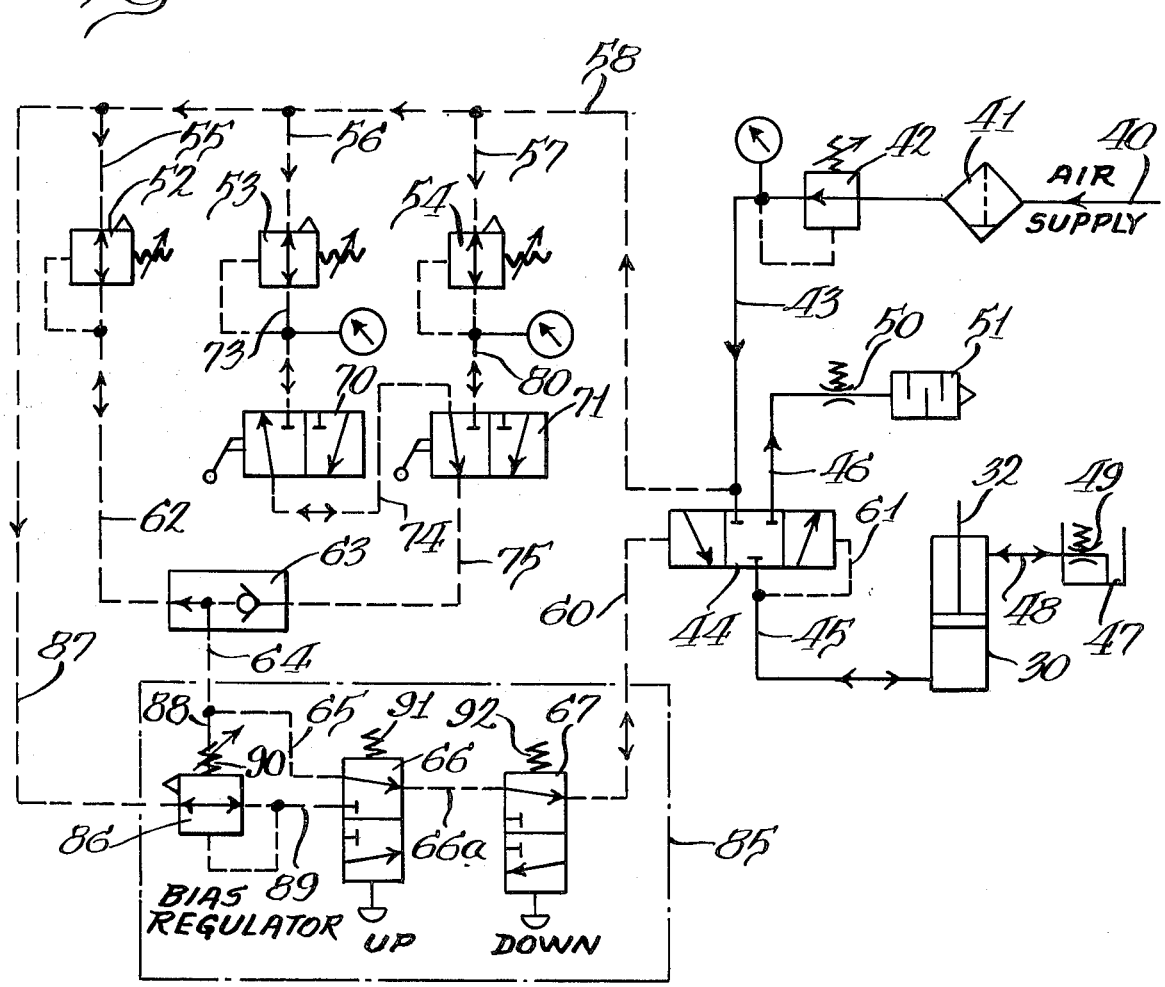
FIG. 2 is a schematic of a fluid control circuit for the load balancer including the balance override control.

Referring to the schematic drawing of FIG. 2, the conventional control circuit for a load balancer includes an air supply line 40 with air passing through a filter 41 to a fluid pressure regulator 42. The circuit is generally referred to as a fluid control circuit, with a preferred embodiment utilizing air and thus providing a pneumatic control circuit. Fluid at a set pressure is directed through line 43 to a control valve 44 which is a three-way valve having fluid pilot sections at each end. An outlet line 45 from the control valve connects to the cylinder 30 at the underside of the piston. A fluid exhaust line 46 extends from the control valve 44 whereby the control valve 44 may block fluid communication to the cylinder 30 or connect the cylinder either to fluid under pressure in line 43 or to exhaust line 46. Up and down safety controls are provided of the type shown in the aforesaid application Ser. No. 181,906, including an oil reservoir 47 connected by a line 48 to the upper side of the cylinder 30 and having a velocity responsive valve 49 which controls the rate of hydraulic flow from the upper side of the cylinder 30 to the reservoir 47 whereby in the event a load on load support arm 10 is lost, the rate of ascent of the load balancer is limited. In the event there is loss of fluid under pressure, a velocity control valve 50 in line 46 limits the rate of outflow of pressure fluid from the cylinder 30 which exhausts through a muffler 51.

The conventional control circuit further includes three adjustable air pressure regulating valves 52, 53, and 54 having their inlets connected by lines 55, 56, and 57, respectively, to a fluid control line 58 which connects to the fluid inlet line 43. The air pressure regulating valves 52–54 can be set to establish three different control pressures. The air pressure regulating valve 52 would be set to establish a control pressure whereby the load balancer would be in balanced condition, with a grab or other fixture utilized in handling a load. The air pressure regulating valve 53 would be set to establish a control pressure to maintain the load balancer in balanced condition when a particular weight load is being balanced. The air pressure regulating valve 54 would be set at a higher control pressure in order to have the load balancer in balanced condition when a heavier load is being supported. In a normal operation, one of these three set control pressures is applied to one end of the control valve 44 through a line 60 which acts in opposition to a pilot section of the control valve 44 which senses the pressure existing in the cylinder 30 through a pilot line 61. When the pressures in lines 60 and 61 are matching, the control valve 44 is closed and the load balancer is in balanced condition. Any change from this balanced condition is detected by an imbalance in pressures in lines 60 and 61 and the control valve 44 is correspondingly adjusted to either increase or decrease the pressure in cylinder 30 and restore a balance in pressures in lines 60 and 61 which results in a balanced condition of the load balancer.

The control pressure set by air pressure regulating valve 52 is directed to the line 60 by means of a line 62 extending to a shuttle valve 63 having an outlet connected to a line 64 which connects to a line 65. The line 65 connects to a manually operated spring returned three-way valve 66, with this valve in its normal position permitting line 65 to communicate with a line 66a extending to a valve 67 of the same type as valve 66. The valve 67 in its normal inactive position connects line 66a to line 60, with the valves being positioned, as shown in FIG. 2, to connect line 62 to line 60. A pair of manually operated toggle valves 70 and 71 determine the utilization of the pressure set by either of air pressure regulating valves 53 and 54, rather than the control pressure set by the air pressure regulating valve 52. Manual actuation of the valve 70 shifts the valve from the position shown in FIG. 2, whereby an outlet line 73 from the air pressure regulating valve 53 and which extends to the valve 70 is placed in communication with a line 74 connected to the valve 71. The line 74, in effect, places the valves 70 and 71 in series and with the valve 71 in inactive position, there is direct flow-through of control pressure to a line 75 extending to the shuttle valve 63 which is caused to shift and connect the line 75 to the line 64 and block outlet line 62 from air pressure regulating valve 52 from communication with line 64. If a heavier load is to be balanced, then the toggle valve 71 is manually actuated which, by its shifting, blocks line 74 from line 75 to remove air pressure regulating valve 53 from the circuit and connect an outlet line 80 from the air pressure regulating valve 54 to the line 75 which similarly shifts the shuttle valve 63 to connect line 75 to line 64 while blocking outlet line 62 from line 64.

The foregoing structure, except for the manually operated spring returned three-way valves 66 and 67 and the shuttle valve 63, is known in the prior patents and applications of the assignee of this application.

The structure providing the balance override control is shown in FIG. 2 within the box defined by a broken line 85. The balance override control includes a bias regulator valve 86 having its inlet connected to a regulated source of fluid pressure by a line 87 connected to the line 58. A pilot section of the bias regulator valve is connected to line 64 by a line 88 and includes an adjustable spring providing a bias. The bias regulator valve 86 functions to deliver a fluid pressure to line 89 which is at a pressure a set amount above whatever pressure exists in line 64. For example, assuming that the fluid pressure in line 87 is 100 psi and the spring 90 of the bias regulator valve is set to provide a bias of 8 psi and the pressure in line 64 obtained from the air pressure regulating valve 53 is 50 psi, then the output of the bias regulator valve 86 would be a control pressure of 58 psi. The actual value of this bias pressure can be determined by the adjustment of the spring 90. The amount of bias will determine the rate at which the load is lifted. An example of a valve usable as a bias regulator valve is a pilot operated spool valve offered by Bellofram, Type 20 AHR.

In normal operation of the balancer, the control pressures are such as to maintain a load in balanced condition whereby slight manual force applied to the load will result in movement of the load in space. With the balance override control, it is possible to cause positive lowering or raising of the load without the application of manual force to the load. When the load is to be positively lifted, the three-way valve 66 is manually actuated to shift the valve against the action of a spring 91 with the result that line 65 normally directing control pressure to the control valve 44 is blocked and the bias pressure set in line 89 is connected to line 66a to establish a higher control pressure in line 60 with the result that control valve 44 shifts to direct a higher pressure from the supply source of line 43 to the cylinder 30. When the load has been positively lifted a desired amount, the three-way valve 66 may be released and returned to the position shown in FIG. 2, whereby the preset control pressure delivered by one of the air pressure regulating valves 52–54 is applied to the control valve 44 with resulting re-establishment of the balancing control pressure in the cylinder 30. If positive lowering of the load is desired, the three-way valve 67 is actuated against the spring 92 which blocks line 66a from communication with line 60 and connects line 60 to exhaust, whereby the pressure in line 60 is of a greater value to shift the control valve and place line 45 extending from the cylinder 30 into communication with the exhaust line 46 whereby there can be a controlled lowering of the load due to gravity acting on the load and a controlled exhaust of the fluid through the velocity-responsive valve 50.

Upon release of the three-way valve 67, the valve returns to the position shown in FIG. 2 to place line 66a back in communication with line 60 whereby the normal control pressure in existence at the time is again applied to the control valve 44 to bring the pressure in the cylinder 30 to a value whereby the load balancer is again operating in balanced condition.

With the structure disclosed herein, a load balancer may operate to support a load in balanced condition for movement to a variety of positions and with positive operation of the load balancer to either raise or lower a load to a desired position and, upon inactivation of the balance override control, the control circuit for the load balancer is again placed in operation to return the load balancer to normal balanced condition.

I claim:

1. In a load balancer, a frame, a load support arm movably mounted on said frame, a power cylinder having a piston movably connected to said arm to act against a load connected to said arm, means connectable to a source of fluid under pressure for applying fluid to said cylinder, a control circuit interposed between said means and said cylinder, said control circuit including a pilot operated valve for directing fluid to and from said cylinder, said valve being responsive to a control fluid pressure and cylinder fluid pressure whereby an imbalance in said fluid pressures resulting from movement of said piston caused by manual movement of the load causes said valve to restore a balance in said pressures, and balance override means for selectively directing a fluid pressure greater than said control fluid pressure to said pilot operated valve to cause said valve to direct a greater fluid pressure to said cylinder to move the load and without changing the established control fluid pressure whereby the load may again be balanced by said established control pressure.

2. In a load balancer, a frame, a load support arm movably mounted on said frame, a power cylinder having a piston movably connected to said arm to act against a load connected to said arm, means connectable to a source of fluid under pressure for applying fluid to said cylinder, a control circuit interposed between said means and said cylinder, said control circuit including a pilot operated control valve for directing fluid to and from said cylinder, said control valve being responsive to a control fluid pressure and cylinder fluid pressure whereby an imbalance in said fluid pressures causes said valve to restore a balance in said pressures, means for establishing plural control pressures of different values corresponding to different load weights, and balance override control means including a bias regulator valve which senses the control fluid pressure for establishing a fluid pressure a fixed amount higher than any one of said control fluid pressures, and valve means for blocking said control fluid pressure from the control valve and applying said higher fluid pressure to the control valve to direct a greater fluid pressure to said cylinder and cause lifting of the load.

3. A load balancer as defined in claim 2 wherein the balance override means further includes means for reducing the control fluid pressure applied to the control valve to cause a reduction in cylinder pressure and lowering of the load.

4. A load balancer as defined in claim 3 wherein said control valve has a position to connect the cylinder to exhaust and is moved to said position when the balance override means reduces the control fluid pressure applied to the control valve, and means in said exhaust line to control the rate of fluid flow to exhaust and therefore the rate of descent of said load.

5. In a load balancer, a frame, a load support arm movably mounted on said frame, a power cylinder having a piston movably connected to said arm to act against a load connected to said arm, means connectable to a source of fluid under pressure for applying fluid to said cylinder, a control circuit interposed between said means and said cylinder and having an adjustable air pressure regulating valve to set a control fluid pressure at a value to obtain a balance of the load, said control circuit including a pilot operated control valve for directing fluid to and from said cylinder, said control valve being responsive to said control fluid pressure and cylinder fluid pressure whereby an imbalance in said fluid pressures causes said valve to restore a balance in said pressures, and balance override control means including a bias regulator valve acted upon by said control fluid pressure for establishing a fluid pressure a fixed amount higher than said control fluid pressure, and valve means for blocking said control fluid pressure from the control valve and applying said higher fluid pressure to the control valve to direct a greater fluid pressure to said cylinder and cause lifting of the load.

* * * * *